(12) United States Patent
Tsukamoto

(10) Patent No.: US 7,039,444 B2
(45) Date of Patent: May 2, 2006

(54) MOBILE COMMUNICATION SYSTEM, METHOD FOR MAKING DATA COMMON AND PROGRAM THEREFOR

(75) Inventor: Tadashi Tsukamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 283 days.

(21) Appl. No.: 10/238,629

(22) Filed: Sep. 11, 2002

(65) Prior Publication Data

US 2003/0050059 A1    Mar. 13, 2003

(30) Foreign Application Priority Data

Sep. 13, 2001    (JP) .............................. 2001-278533

(51) Int. Cl.
*H04B 1/38* (2006.01)
*H04L 12/66* (2006.01)
*G01C 17/00* (2006.01)

(52) U.S. Cl. .................... 455/566; 455/426; 370/352; 702/152

(58) Field of Classification Search ................ 455/557, 455/456.3, 417, 419, 567, 458, 466, 418, 455/426.1, 566, 415, 414.4, 437; 370/352; 395/183.2; 345/1.1; 702/152
See application file for complete search history.

(56) References Cited

U.S. PATENT DOCUMENTS

| | | | | |
|---|---|---|---|---|
| 5,634,198 A | * | 5/1997 | Cameron et al. | .......... 455/63.1 |
| 5,884,326 A | * | 3/1999 | Weinger et al. | ............. 707/201 |
| 5,907,418 A | * | 5/1999 | Walczak et al. | ............ 398/106 |
| 5,915,210 A | * | 6/1999 | Cameron et al. | ............. 455/59 |
| 5,920,826 A | * | 7/1999 | Metso et al. | ................. 455/557 |

(Continued)

FOREIGN PATENT DOCUMENTS

| | | |
|---|---|---|
| DE | 197 19 908 | 11/1998 |
| DE | 100 49 291 A1 | 4/2002 |
| EP | 1 180 903 A1 | 8/2001 |
| JP | 2001-203997 | 7/2001 |
| JP | 2001-203997 A | 7/2001 |
| WO | WO 02/43389 | 11/2000 |

(Continued)

*Primary Examiner*—William Trost
*Assistant Examiner*—Kiet Doan
(74) *Attorney, Agent, or Firm*—Foley & Lardner LLP

(57) ABSTRACT

Frame data (letters, images, still images, motion picture images, etc.) displayed on the display unit in a transmitting side portable telephone set 1 are transmitted via a radio terminal interface (such as Bluetooth) to other receiving side portable telephone set 2 to n, and displayed in the display units therein. Thus, the data displayed on the display unit in any given portable telephone set can be displayed and read out with a plurality of other portable telephone sets, so that they can be have substantially as common data.

19 Claims, 7 Drawing Sheets

U.S. PATENT DOCUMENTS

| | | | | |
|---|---|---|---|---|
| 6,026,303 A | * | 2/2000 | Minamisawa | 455/446 |
| 6,275,707 B1 | * | 8/2001 | Reed et al. | 455/456.3 |
| 6,564,067 B1 | * | 5/2003 | Agin | 455/522 |
| 6,594,485 B1 | * | 7/2003 | Ezaki | 455/417 |
| 6,633,759 B1 | * | 10/2003 | Kobayashi | 455/419 |
| 6,675,008 B1 | * | 1/2004 | Paik et al. | 455/415 |
| 6,697,839 B1 | * | 2/2004 | Sini et al. | 709/203 |
| 6,819,944 B1 | * | 11/2004 | Sato | 455/566 |
| 6,826,614 B1 | * | 11/2004 | Hanmann et al. | 709/227 |
| 2002/0022476 A1 | * | 2/2002 | Go | 455/414 |
| 2002/0045331 A1 | * | 4/2002 | Aminpur | 438/585 |
| 2002/0082054 A1 | * | 6/2002 | Keinonen et al. | 455/567 |
| 2002/0085537 A1 | * | 7/2002 | Carlsson et al. | 370/352 |
| 2002/0102978 A1 | * | 8/2002 | Yahagi | 455/437 |
| 2002/0126652 A1 | * | 9/2002 | Ha et al. | 370/352 |
| 2004/0015325 A1 | * | 1/2004 | Hirano et al. | 702/152 |

FOREIGN PATENT DOCUMENTS

WO    WO 01/43351    6/2001

* cited by examiner

MOBILE COMMUNICATION SYSTEM, METHOD FOR MAKING DATA COMMON AND PROGRAM THEREFOR

BACKGROUND OF THE INVENTION

This application claims benefit of Japanese Patent Application No. 2001-278533 filed on Sep. 13, 2001, the contents of which are incorporated by reference.

The present invention relates to mobile communication system for communication between mobile communication terminals having communication function such as portable telephone sets and mobile PCs (personal computers), method for making data common in the same system and program for the same method.

Up to date, with portable telephone set performance improvement, data displayed on the portable telephone set display screens are in a trend of becoming multi-media data. To keep pace with this, the portable telephone set display contents are not considered only in the aspect of man-machine interface/graphical user interface, but are becoming valuable in themselves.

However, the portable telephone set display screen does not have a size sufficient for being read by a plurality of persons at a time, and in order for a plurality of users to have the data as common data the users have to read the data together on a single portable telephone set.

In another method, contents data desired to be read at a time are preliminarily stored in individual telephone sets to be displayed as desired. This method, however, has a problem that the same data have to be preliminarily down-loaded and stored in each portable telephone set via internet or like network.

In the meantime, as a system for realizing local communication between mobile communication terminals, Bluetooth and like radio external interface standards have appeared, and it is in a trend to organize one-to-plural local broadcast communication without being restricted to the one-to-one communication status as in the existing cable connection.

SUMMARY OF THE INVENTION

An object of the present invention is to provide mobile communication system, which makes use of the property of local communication to a plurality of mobile communication terminals via a radio external interface, thereby permitting the plurality of mobile communication terminals to display and read the same display contents, method of making data to be common in the same system and program for the same method.

According to an aspect of the present invention, there is provided a mobile communication system comprising a plurality of mobile communication terminals connected via a mobile communication network, wherein: each of the plurality of mobile communication terminals has a radio external interface for performing communication via a communication network different from said mobile communication terminal; transmitting data displayed on the display unit in a given mobile communication terminal is transmitted via said radio external interface means to another mobile communication terminal; and said data transmitted by the radio external interface means is displayed on the display unit in said another mobile communication terminal.

The radio external interface means transmits data displayed on the display unit in said given mobile communication terminal to said another mobile communication terminal in a communication mode selected among: a first communication mode, in which data displayed on the display are obtained and transmitted unit at a uniform interval; a second communication mode, in which whenever data displayed on the display unit are updated, the updated data are obtained and transmitted; and a third communication mode, in which data displayed on the display unit are obtained and transmitted at any timing. The mobile communication terminals each have a setting means for setting either one of said communication modes. The communication terminals each have an instructing means for externally instructing any timing in the third communication mode.

According to another aspect of the present invention, there is provided a method for making data common in a mobile communication system comprising a plurality of mobile communication terminals connected via a mobile communication network, wherein: each of the plurality of mobile communication terminals has a radio external interface for performing communication via a communication network different from said mobile communication terminal; a transmitting step for transmitting data displayed on the display unit in a given mobile communication terminal via said radio external interface means to another mobile communication terminal; and a displaying step for displaying said data transmitted by the transmitting step on the display unit in said another mobile communication terminal.

The transmission step transmits data in a communication mode selected among: a first communication mode, in which data displayed on the display are obtained and transmitted unit at a uniform interval; a second communication mode, in which whenever data displayed on the display unit are updated, the updated data are obtained and transmitted; and a third communication mode, in which data displayed on the display unit are obtained and transmitted at any timing. The mobile communication terminals each have a setting step for setting either one of said communication modes. The mobile communication terminals each have an instructing step for externally instructing any timing in the third communication mode.

According to another aspect of the present invention, there is provided a program for a mobile communication system in which a plurality of mobile communication terminals are connected via a mobile communication network and each of the plurality of mobile communication terminals has a radio external interface for performing communication via a communication network different from said mobile communication terminal, including the following programs: causing a given mobile communication terminal to perform transmitting process for transmitting data displayed on the display unit in the given mobile communication terminal via said radio external interface means to another mobile communication terminal; and causing the another mobile communication terminal to perform displaying process for displaying said data transmitted by the transmitting process on the display unit in said another mobile communication terminal.

The transmission process transmits data in a communication mode selected among: a first communication mode, in which data displayed on the display are obtained and transmitted unit at a uniform interval; a second communication mode, in which whenever data displayed on the display unit are updated, the updated data are obtained and transmitted; and a third communication mode, in which data displayed on the display unit are obtained and transmitted at any timing.

In summary, the screen data displayed on a display part of a given portable telephone set is transmitted via a Bluetooth or like radio external interface to other portable telephone sets for display there. Thus, letter data, image data, still images and motion picture images that are displayed on the display unit of the given portable telephone set can be transmitted to a plurality of other portable telephone sets, and it is thus possible to make the data displayed on the screen to be common data.

Other objects and features will be clarified from the following description with reference to attached drawings.

PREFERRED EMBODIMENTS OF THE INVENTION

Preferred embodiments of the present invention will now be described with reference to the FIGS. 1 to 7 showing the mobile communication system according to the present invention, the method of making data to be common in the system and the program for the same method.

Figure 1:
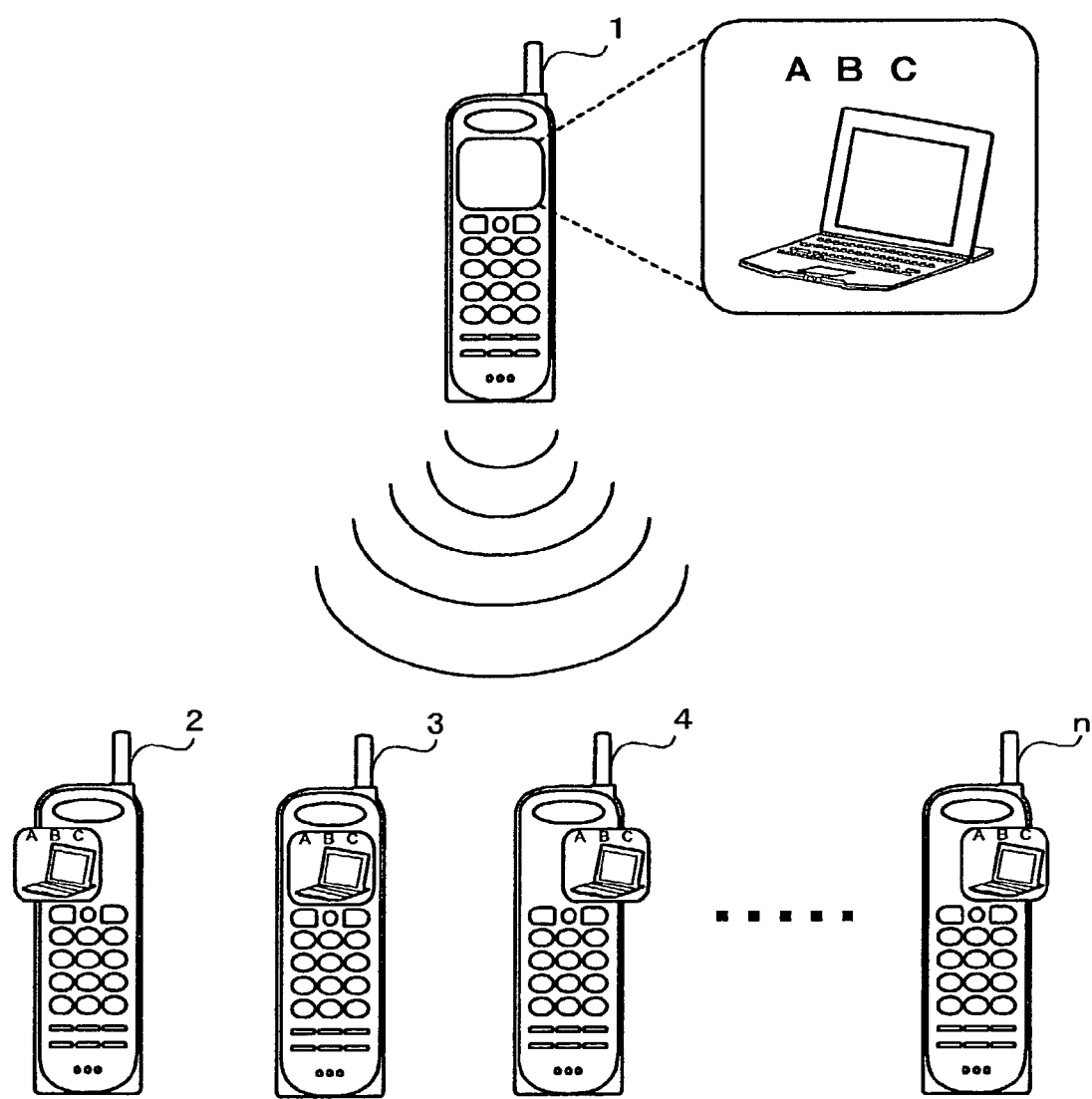
FIG. 1 is a schematic representation of a system configuration illustrating the basic concept of an embodiment of the mobile communication system according to the present invention.

FIG. 1 is a schematic representation of a system configuration illustrating the basic concept of an embodiment of the mobile communication system according to the present invention. Referring to the Figure, this embodiment of the system according to the present invention is constituted by a plurality of portable telephone sets 1 to n coupled together via a mobile communication network. These portable telephone sets 1 to n are mutually coupled together by local coupling via radio external interfaces (for instance Bluetooth). For the sake of brevity, the following description will be made by assuming the portable telephone set 1 to be a transmitting side portable telephone set and the portable telephone sets 2 to n as receiving side portable telephone sets. Actually, both the transmitting and receiving side portable telephone sets perform different operations in the system, but are not different in construction.

As shown in FIG. 1, letter data "ABC" and image data representing a "notebook personal computer", as displayed on the display screen in the transmitting side portable telephone set 1, are transferred (i.e., transmitted) by radio external interface function to the receiving side portable telephone sets 2 to n to be displayed on the display parts therein. Thus, the receiving side portable telephone sets 2 to n have the data displayed on the display screen in the transmitting side portable telephone set 1 as common data.

Figure 2:
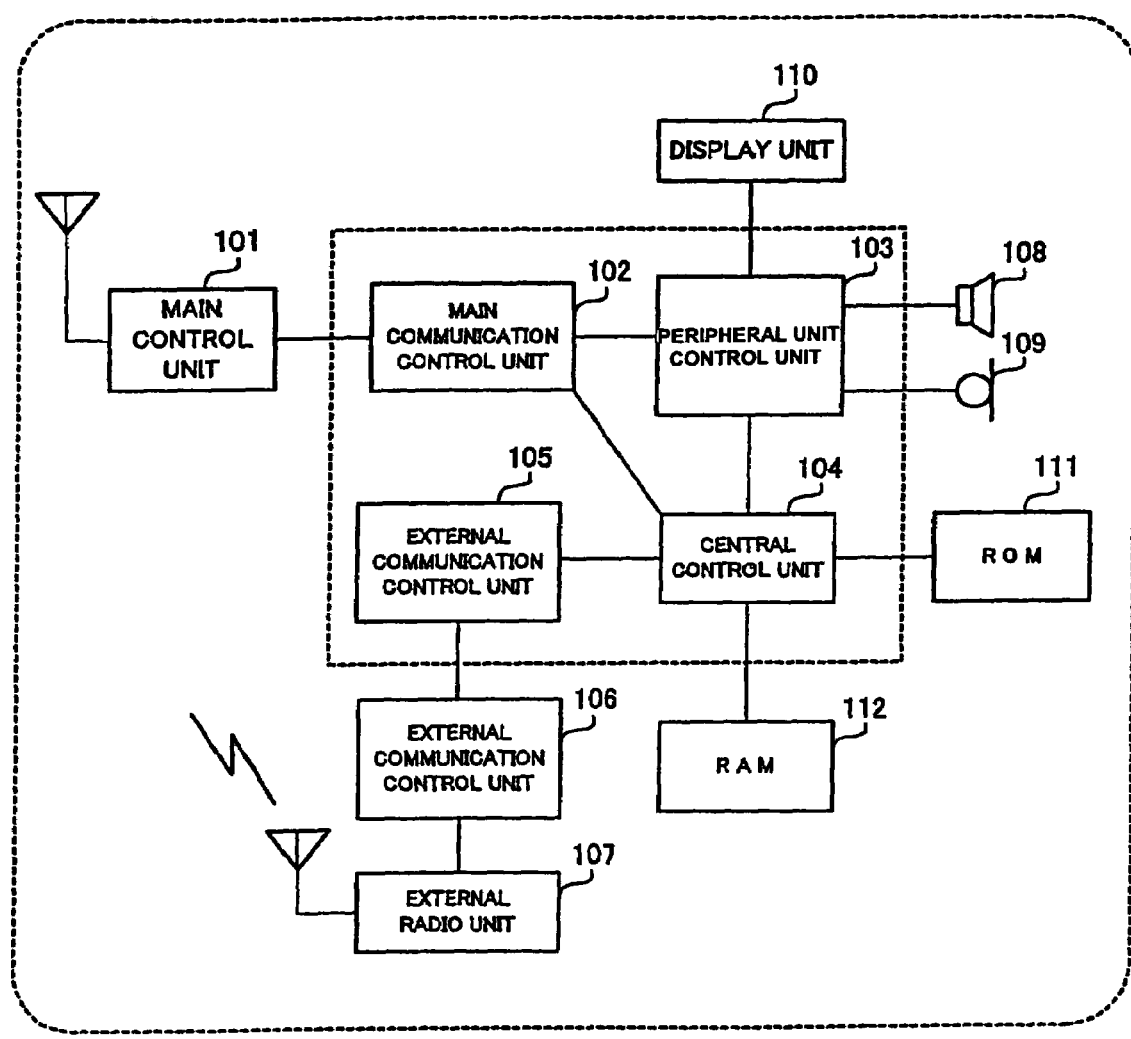
FIG. 2 is a block diagram showing the schematic construction of a portable telephone set in the embodiment of the present invention.

FIG. 2 is a block diagram showing the schematic construction of a portable telephone set in the embodiment of the present invention. In the Figure, the transmitting side portable telephone set 1 comprises a main radio unit 101, a main communication controller unit 102, a peripheral unit controller unit 103, a central controller unit 104, an external IF (interface) controller unit 105, an external communication controller unit 106, an external radio unit 107, a loudspeaker unit 108, a receiver unit 109, a display unit 110, a ROM 111 and a RAM 112.

The transmitting side portable telephone set 1 is coupled via the main radio unit 101 to the mobile communication network. The main communication controller unit 102 controls the communication processes executed with respect to other portable telephone sets via the mobile communication network. Frequency signals for transmission/reception in the main radio unit 101 are roughly classified into groups of 800 MHz and 1.5 GHz bands. In the case of PH terminal, a higher 1.9 GHz bands is used.

The peripheral unit control unit 103 controls the operations of the peripheral units, i.e., the loudspeaker unit 108, the receiver unit 109 and the display part 110. The central controller unit 104 serves to read out operation control programs stored in the ROM 111 and control the operations of various units constituting the transmitting side portable telephone set 1.

The external IF control unit 105, the external communication control unit 106 and the external radio unit 107 serve together as the radio external interface, and in the case of, for instance, Bluetooth they permit local communication with other portable telephone sets using 2.4 GHz band frequency signal. While the external IF control unit 105 is shown to be connected to the central controller unit 104, it may as well be provided in the peripheral unit control unit 103. Hereinafter, the external if control unit 105, the external communication control unit 106 and the external radio unit 107 are together referred to as radio external IF.

The display unit 110 is a display using TFT liquid crystal, TFD liquid crystal, organic EL, etc., and serves to display the still images and motion picture images stored in the RAM 112 in the transmitting side portable telephone set 1 or an externally provided removable memory or the like (hereinafter referred to as viewer function).

The ROM 111, as described above, is a memory for storing the application software for controlling various units in the portable telephone set.

The RAM 112 is a memory, which can serve to provisionally store the data transmitted from any other portable telephone set via the external radio IF or the main radio unit 101 and be used as working area for operation control programs read out from the ROM 111 by the central controller unit 104.

In FIG. 2, the main control unit 102, the peripheral unit control unit 103, the central controller unit 104 and the external IF unit 105 are shown to provide independent functions, respectively, it is also possible to provide a unified structure by combining these units.

When the power supply to the radio external IF is turned on by a user's button (depressing) operation, the transmitting side portable telephone set 1 provides a function of transmitting the screen data displayed in the own display unit 110 to the other portable telephone sets 2 to n and a function of receiving screen data transmitted from the other portable telephone sets 2 to n. The screen data received in the receiving function from the other portable telephone sets 2 to n are displayed in the viewer function on the display unit 110.

When a receiving function operation command is inputted by a button depressing operation, the power supply to the main radio unit 101 and the main communication control unit 102 are turned off to prevent simultaneous start of transmitting/receiving process via the radio external IF.

With the transmitting function started, the transmitting side portable telephone set is able to execute the same operations as in the normal state. Thus, at a certain timing it captures the screen data displayed on the display unit and broadcast-transmits the captured data via the radio external IF.

With the receiving function started, the receiving side portable telephone set starts the viewer function. Thus, unless it is discontinued by a user's operation, the sole viewer function is provided for continuously drawing the received data.

In the radio external IF, the communication rate is set to be at least equal to screen control data rate to permit communication of screen control data via the radio external IF.

As an example, when realizing the functions according to the present invention between the portable telephone sets with displays, which are capable of displaying 65536 (i.e., $2^{16}$) colors with 240×320 dots and a refresh rate of 60 Hz, transmission of display data as bit map data requires a transmission rate as shown in the following equation (1) even without consideration of the time of access to the memory, times necessary for transmitted and received data processes or overhead at the time of communication.

$$240\times320\times16\times60 = 73728000 \text{ bps} \approx 74 \text{ Mbps} \quad (1)$$

Actually, however, it is estimated that a communication rate of about 100 Mbps is necessary.

When the communication rate in the radio external IF is insufficient, frame rate adjustment of the display screen is necessary. As an example, assuming the communication rate in the radio external IF to be 1 Mbps, the re-frame rate is $$60 \text{ Hz}/100 \approx 0.60 \text{ Hz} \quad (2)$$

Accordingly, for the screen data transmission the following three transmission modes are prepared, which can be selected as desired by the transmitting side user.

Figure 3:
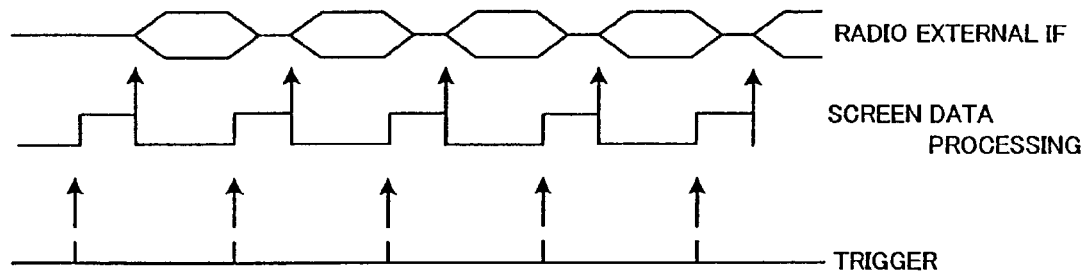
FIG. 3 is a timing chart summarizing the transmission modes.
Figure 3:
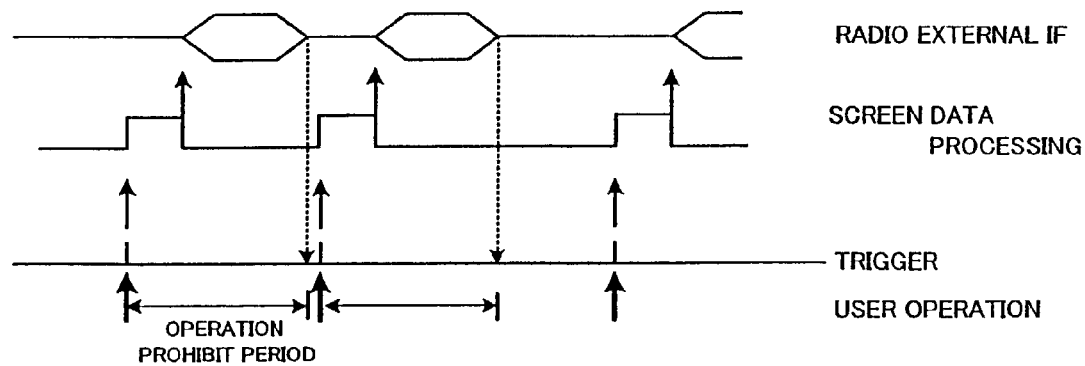
Figure 3:
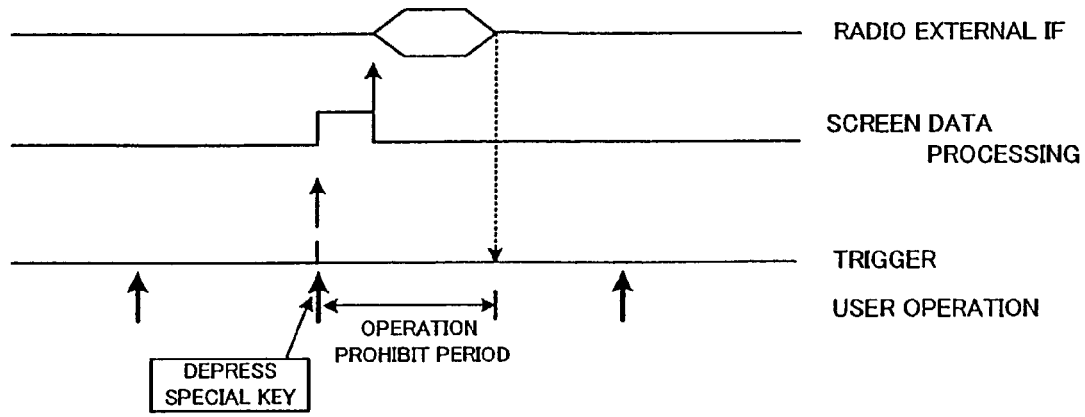

FIG. 3 is a timing chart summarizing the transmission modes.

As shown in the Figure, in a first transmission mode, the screen data are captured and transmitted at a uniform time interval (mode 1). In a second transmission mode, the screen data are captured and transmitted whenever the screen data are updated by a transmitting side user's operation (mode 2). In a third transmission mode, the screen data which is desired by the transmitting side user to be transmitted, are captured and transmitted by a special key combination or like means (mode 3).

In the first transmission mode, when it is intended to broadcast the stream data such as motion picture images, for at least obtaining a meaning transfer function in a cause-and-effect relation even with a screen updating rate of once per two seconds as given by the equation (2), the frame rate may be set to a fixed rate in correspondence to the capacity of the radio external IF mounted in the portable telephone set. At this fixed frame rate or interval, the screen data displayed on the display unit may be captured for broadcasting the captured image data via the radio external IF to the other portable telephone sets.

In the second transmission mode, there may be a case, when the normal user interface operation is being done in the transmitting side portable telephone set, that meaning transfer can not be attained by focus movement to icon on the screen or screen scrolling merely with a uniform frame interval of data transmission and reception. In such a case, the user triggers the screen updating by the button operation to capture the screen data displayed on the display unit and broadcast the captured image data via the radio external IF to the other portable telephone sets. At this time, it becomes necessary, until the screen data transmission in each cycle operation has been completed, that the transmitting side portable telephone set prohibits the next operation and screen updating (operation prohibition period).

In the third transmission mode, there may be a case, in which it is cumbersome to capture screen data in each cycle operation and prohibit the next operation until completion of the transmission. Accordingly, a function is necessary, which permits capturing the present screen data as desired by the transmitting side portable telephone set under by such means as a combination with a special key and broadcasting the captured image data via the radio external IF to the portable telephone sets. Again in this case, it becomes necessary to prohibit the next cycle operation and screen updating until completion of the transmission (operation prohibition period).

Preferably, it is made possible to select either one of the three transmission modes and also update the selected mode at the time of user's operation. Also, the selection and updating of the transmission mode can desirably made during the above function operation.

Furthermore, preferably in either of the above transmission modes it is made possible on the receiving side to transfer received data to the memory for image data drawing with the viewer function without being aware of the frame interval but by monitoring the frame starts and ends on the radio external IF.

Moreover, it is a preamble that during execution of the function according to the present invention the radio external IF link is continuously maintained in both the transmitting and receiving side portable telephone sets.

Figure 4:
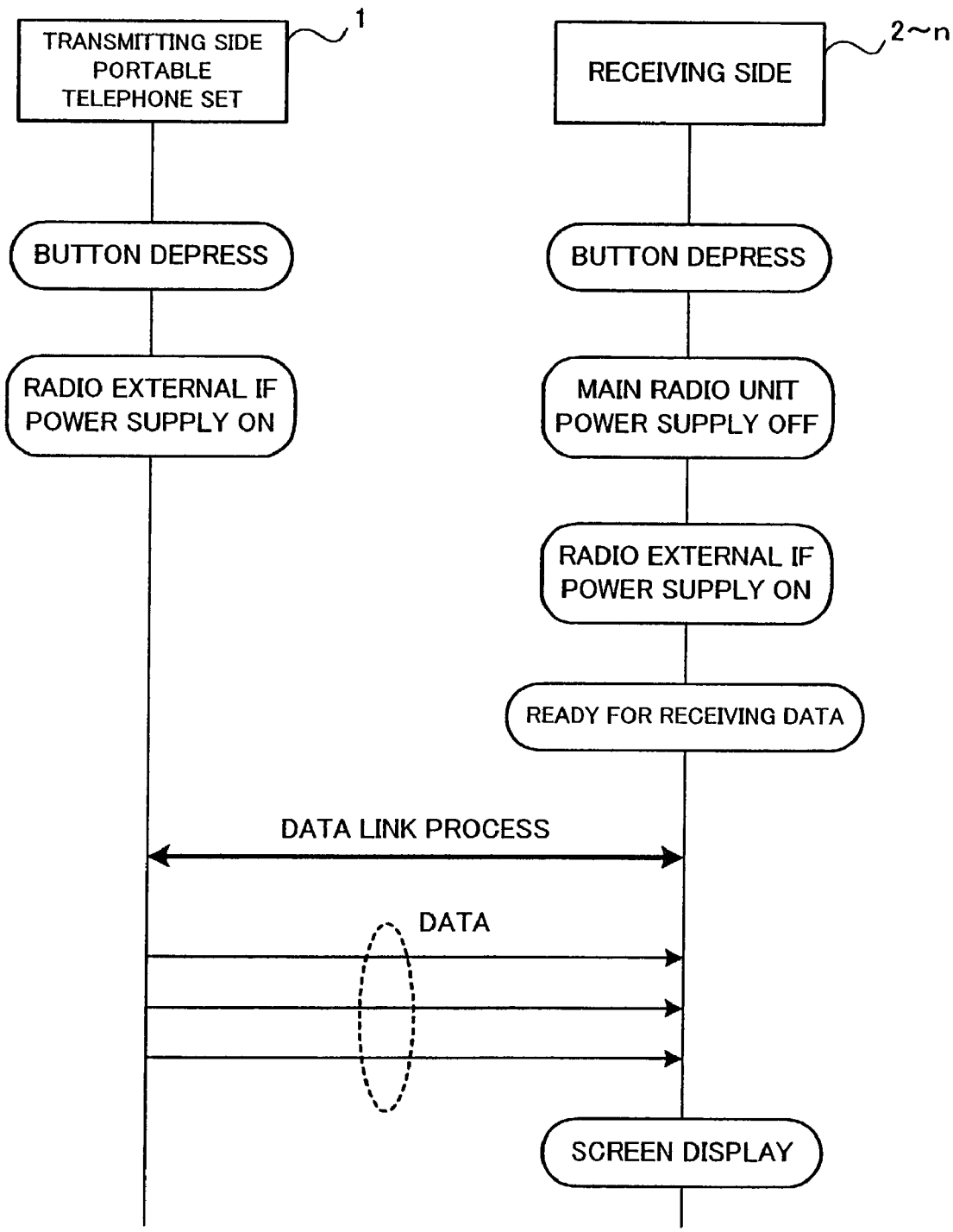
FIG. 4 is a sequence diagram showing an example of operation of the embodiment of the mobile communication system according to the present invention.

FIG. 4 is a sequence diagram showing an example of operation of the embodiment of the mobile communication system according to the present invention. Referring to the Figure, in the transmitting side portable telephone set 1 for transmitting the screen data displayed on the display unit, in response to user's button operation the power supply to the radio external IF is turned on to be ready for screen data transmission.

In the receiving side portable telephone sets 2 to n the viewer function is preliminarily started by user's button operation. At this time, the portable telephone set function is restricted while the screen data are received. Specifically, the power supply to the main radio unit 101 or the main communication processor unit 102 coupled to the mobile network is turned off to effect restriction by excluding functions requiring button operation (such as stopping of the viewer function). Then, the power supply to the radio external IF is turned on to be ready for receiving data.

In the transmitting side portable telephone set 1 and the receiving side portable telephone sets 2 to n having already been ready to receive the data, a data link procedure in the radio external IF is executed. This procedure is dependent on the specifications of the radio external interface.

After completion of the data link procedure in the radio external IF, the transmitting side portable telephone set 1 broadcast transmits the data (i.e., screen data) to the receiving side portable telephone sets 2 to n. During this time, in the transmitting side portable telephone set 1 it is possible to use the normal function, while in the receiving side portable telephone sets 2 to n the operation function is continuously limited.

Figure 5:
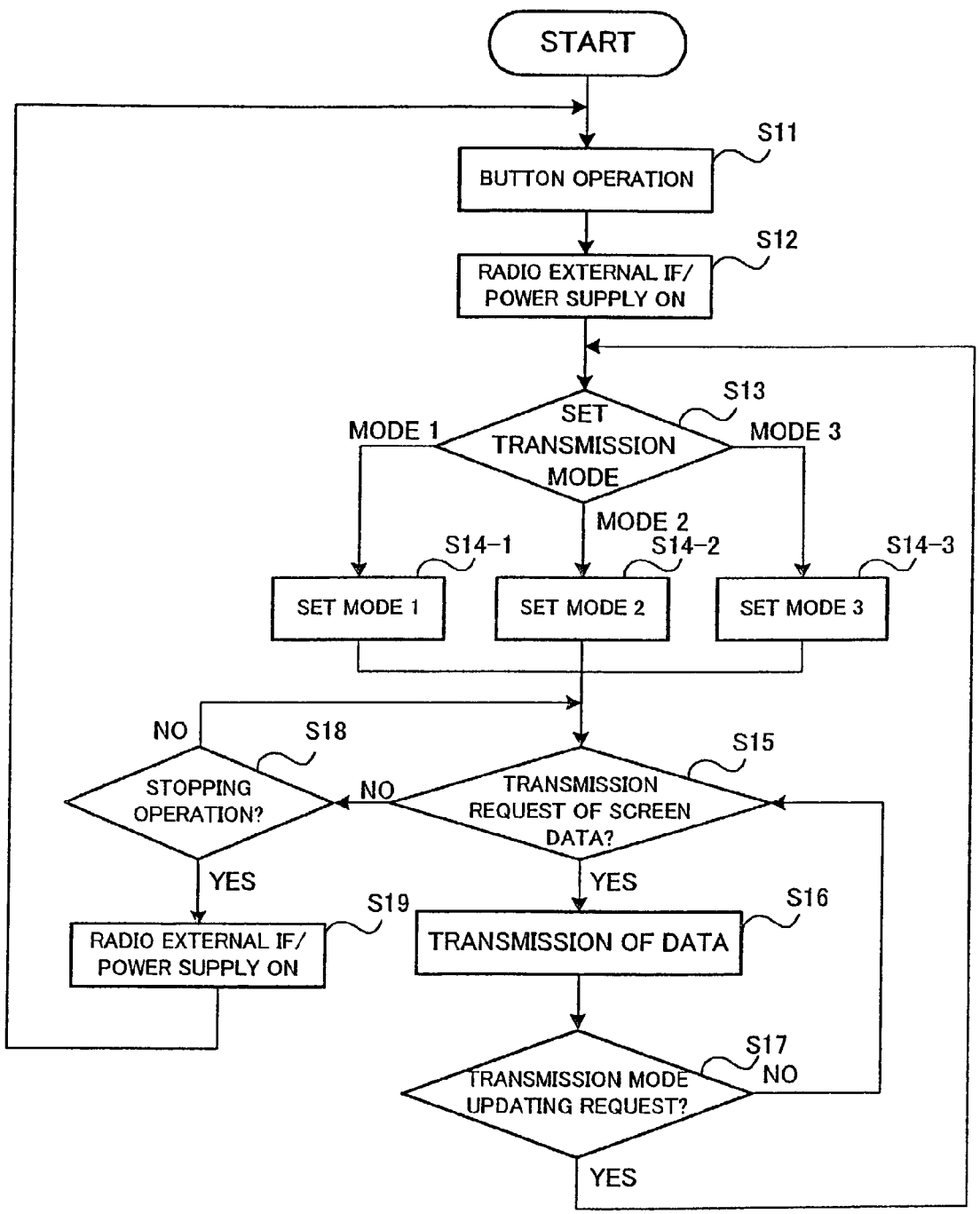
FIG. 5 is a flow chart illustrating an example of operation of the transmitting side portable telephone set.

FIG. 5 is a flow chart illustrating an example of operation of the transmitting side portable telephone set.

Referring to FIG. 5, in the transmitting side portable telephone set, in response to user's button operation (step S11), the power supply to the radio external IF (i.e., the external IF control unit, the external communication control unit and the external radio unit) is turned on (step S12).

Subsequently, in the transmitting side portable telephone set the transmission mode is set up (step S13). When the transmission mode is "mode 1" in the step S13, the "mode 1" is set up (step S14-1). When the transmission mode is "mode 2", the "mode 2" is set up (step S14-2). When the transmission mode is "mode 3", the "mode 3" is set up (step S14-3).

When the transmission mode has been set in either one of the steps S14-1 to S14-3, a check is made as to whether a screen data transmission request from any receiving side portable telephone set is present (step S15). When the transmission request is present ("YES" in step S15), screen data displayed on the display unit are captured and transmitted in the transmission mode that has been set up (step S16).

After the end of or during the data transmission, a check is made as to whether a transmission mode updating request is present (step S17). When no updating request is present ("NO" in step S17), the routine goes back to the process in the step S15. When an updating request is present ("YES" in step S17), the routine goes back to the process in the step S13.

When it is found in the step S15 that no screen data transmission request from any receiving side portable telephone set is present ("NO" in step S15), the transmitting side portable telephone set makes a check as to whether a user's stopping operation has been made (step S18). When no user's stopping operation has been made ("NO" in step S18), the routine goes back to the process in the step S15.

When it is found in the step S18 that a user's stopping operation has been made ("YES" in step S18), the power supply to the radio external IF is turned off (step S19), and the routine goes back to the process in the step S11.

Figure 6:
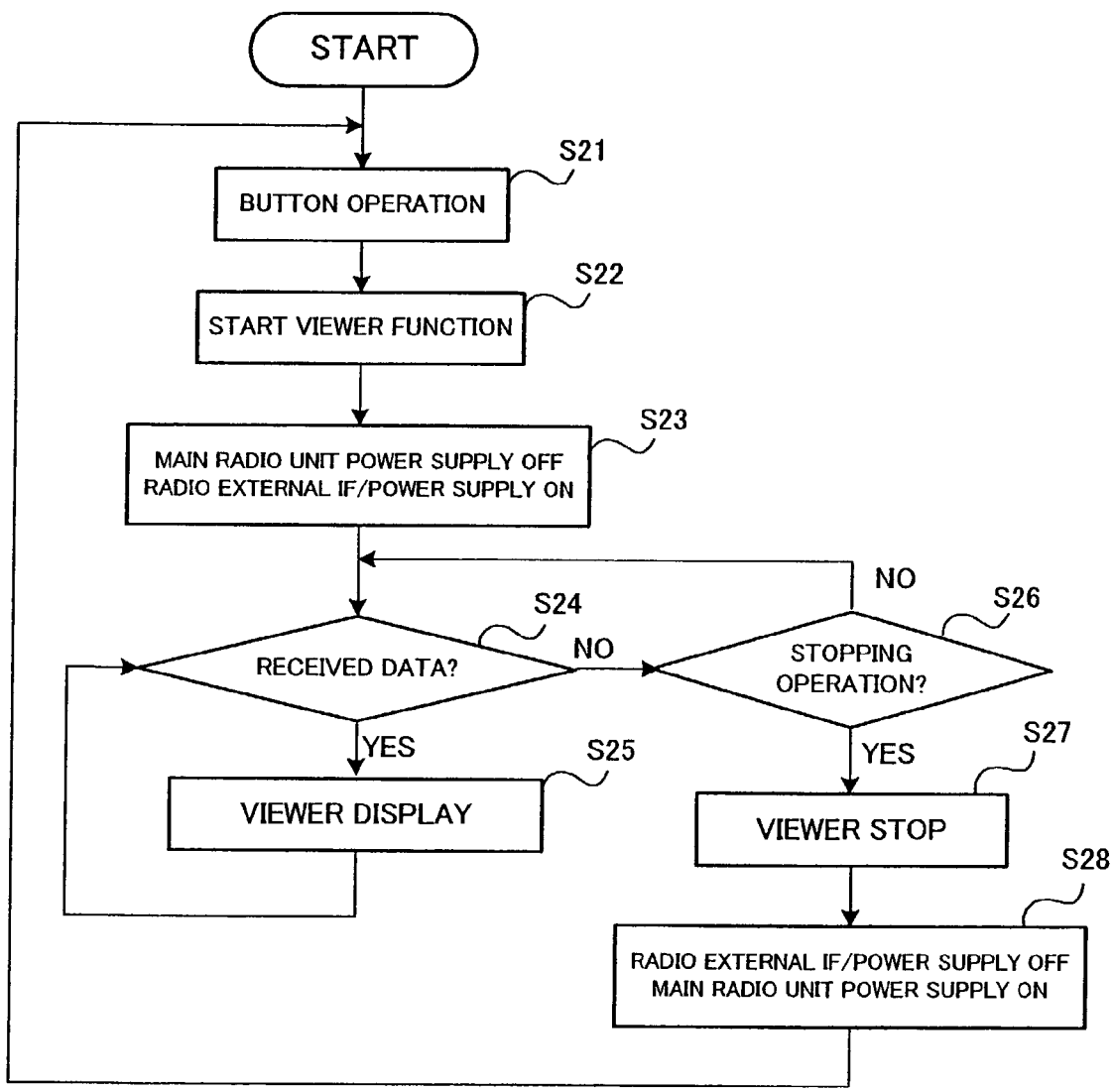
FIG. 6 is a flow chart illustrating an example of operation of the receiving side portable telephone set.

FIG. 6 is a flow chart illustrating an example of operation of the receiving side portable telephone set.

Referring to the Figure, in response to a user's button depressing operation (step S21), the receiving side portable telephone set starts the viewer function (step S22).

Subsequently, in the receiving side portable telephone set, the power supply to the main radio unit is turned off, while turning on the power supply to the radio external IF (i.e., the external IF controller unit, the external communication controller unit and the external radio unit) is turned on (step S23), and then a check is made as to whether the received data are present (step S24).

When it is found in the step S24 that that received data are present ("YES" instep S24), the data are displayed with the viewer function (step S25). This process is continuously executed until the received data have all been displayed.

When it is found in the step S24 that no received data are present or all the received data have been displayed ("NO" in step S24), a check is made as to whether a user's stopping operation has been made (step S26). When no user's stopping operation has been made ("NO" in step S26), the routine goes back to the process in the step S24.

When it is found in the step S26 that a user's stopping operation has been made ("YES" in step S26), the viewer function is stopped (step S27), and then the power supply the radio external IF is turned off, while turning on the power supply to the main radio unit (step S28).

The screen display control in the individual portable telephone sets varies with the mounted display device (such as TFT liquid crystal, TFD liquid crystal and organic EL). In the embodiment of the present invention, the screen data are transmitted as bit map data from the radio external IF, and in each portable telephone set having received the pertinent screen data, data transformation is made for each display device, thus effecting screen data display control.

Figure 7:
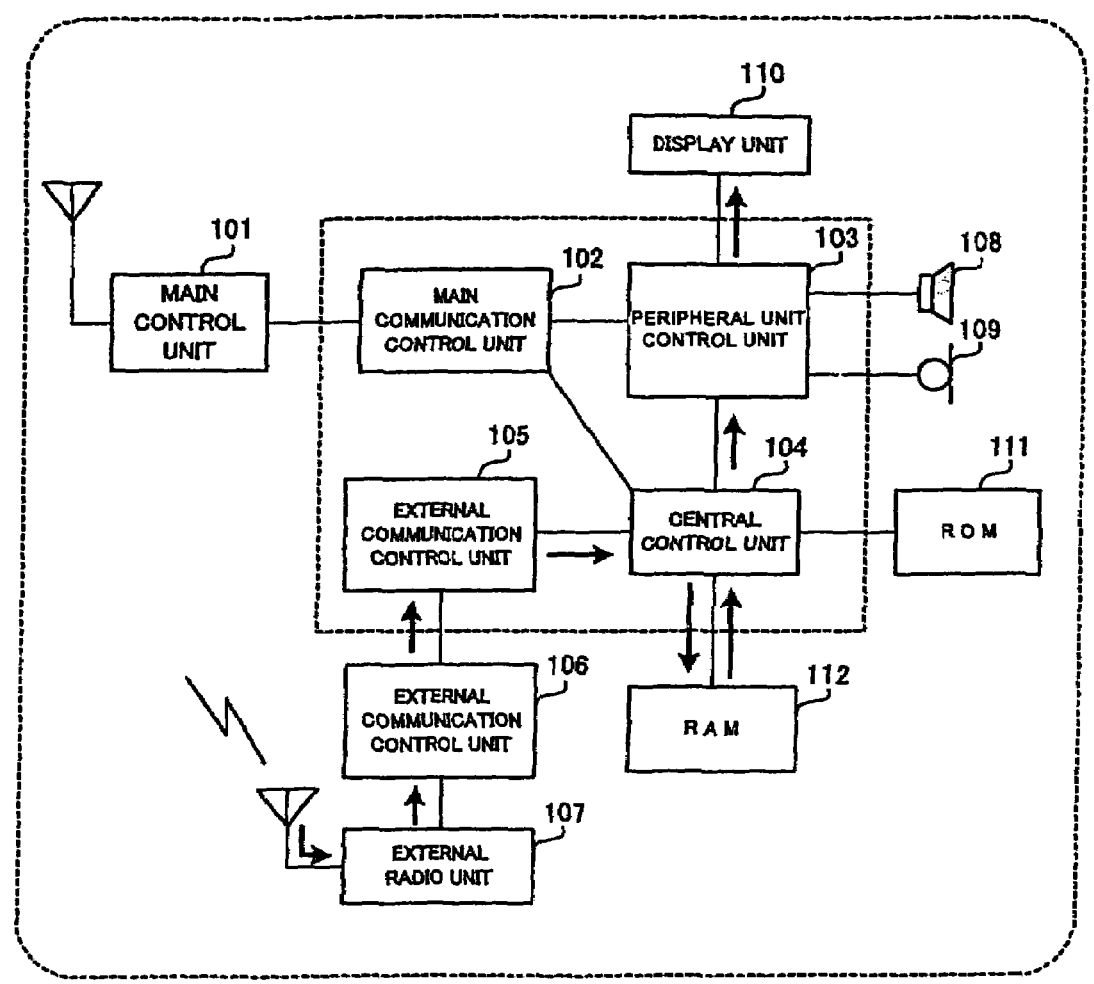
FIG. 7 is a block diagram showing received data transfer path in the receiving side portable telephone set.

FIG. 7 is a block diagram showing the received data transfer path in the receiving side portable telephone set. In the receiving side portable telephone set, the screen data division received in the radio external IF (i.e., the external radio unit 107, the external communication controller unit 106 and the external IF controller 105), are stored via the center controller unit 104 in the RAM 112. Whenever a screen data reception cycle operation has been ended, the received data are transformed in the central controller unit 104 or in the peripheral unit controller unit 103 into the data for the display device, the transformed data being transmitted by a built-in display device driver to the display unit 110 for the screen data display. In this way, the data displayed on the display unit of the transmitting side portable telephone set are displayed on the display unit (i.e., screen) in each receiving side portable telephone set.

As a different embodiment of the present invention, in which the receiving side portable telephone set has a function of preserving frames as motion picture images, it is possible to store the frame data, which have been transmitted from the transmitting side portable telephone set and displayed on the own screen as novel motion picture images. As an example, in the case with a camera function provided by using a photo-sensitive element such as a CCD or a CMOS mounted in the body of the transmitting side portable telephone set or as an attachment, the data (of moving picture images and still images) picked up by such photo-sensitive element can be displayed on the receiving side portable telephone set or newly stored as motion picture images.

In the above embodiments, a system was adopted, in which the frame rate is adjusted in conformity to the communication rate of the radio external IF. As further embodiments, it is possible to adopt various other adjustment systems such as reduction of the display color number and image data compression. Any of these systems is dependent on the processing capacity of the portable telephone set. However, adopting means fitted to the communication rate of the radio external IF and the capacity of the portable telephone set in combination of the frame rate adjustment, it is possible to realize transfer of richer image data in quantity. When adopting the image data compression system, reversible compression in Huffman or LZ coding roles are preferred to the non-reversible compression such as JPEG coding roles.

The above embodiments are merely preferred forms of the present invention, and various changes and modifications may be made without departing from the subject matter of the present invention. For example, while in the above embodiments of the present invention the radio external IF (Bluetooth) is mounted as mobile communication terminal in the portable telephone set, this is by no means limitative, and the present invention is applicable to mobile terminals such as PDAs as well.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

As has been described in the foregoing, according to the present invention it is possible to permit motion picture image or like data to be read out at a time with a plurality of portable telephone sets, so that a plurality of persons can obtain the same data. For example, the present invention is effective in the case of discussion on a meeting with data on a portable telephone set as sample or presentation using portable telephone sets.

What is claimed is:

1. A mobile communication system comprising a plurality of mobile communication terminals connected via a mobile communication network, wherein:
   each of the plurality of mobile communication terminals has a radio external interface for performing communication via a communication network different from said mobile communication network;
   data displayed on a display unit in a given mobile communication terminal is transmitted via said radio external interface to another mobile communication terminal at substantially uniform time intervals; and
   said data transmitted by the radio external interface is displayed on a particular display unit in said another mobile communication terminal, wherein
   the radio external interface may also transmit said data displayed on the display unit in said given mobile communication terminal to said another mobile communication terminal in a communication mode selected among:
   a second communication mode, in which whenever data displayed on the display unit are updated, the updated data are obtained and transmitted; and
   a third communication mode, in which data displayed on the display unit are obtained and transmitted at any timing.

2. The mobile communication system according to claim 1, wherein the mobile communication terminals each have a setting means for setting either one of said communication modes.

3. The mobile communication system according to claim 1, wherein the mobile communication terminals each have an instructing means for externally instructing any timing in the third communication mode.

4. The mobile communication system according to claim 1, wherein the mobile communication terminals each have an instructing means for externally instructing any timing in the third communication mode.

5. The mobile communication system of claim 1, wherein said given mobile communication terminal sets said substantially uniform time intervals based on a capacity of said radio external interface.

6. The mobile communication system of claim 1,
   wherein said data transmitted by said radio external interface comprises media data having a specified frame rate; and
   wherein said given mobile communication terminal sets said substantially uniform time intervals based on said frame rate of said data.

7. The mobile communication system of claim 6, wherein said data comprises motion picture images.

8. A method for making data common in a mobile communication system, said mobile communication system comprising a plurality of mobile communication terminals connected via a mobile communication network, each of the plurality of mobile communication terminals having a radio external interface for performing communication via a communication network different from said mobile communication network, said method comprising:
   a transmitting step for transmitting data displayed on a display unit in a given mobile communication terminal via said radio external interface to another mobile communication terminal at substantially uniform time intervals; and
   a displaying step for displaying said data transmitted by the transmitting step on a particular display unit in said another mobile communication terminal, wherein
   the transmission step may also transmit data in a communication mode selected among:
   a second communication mode, in which whenever data displayed on the display unit are updated, the updated data are obtained and transmitted; and
   a third communication mode, in which data displayed on the display unit are obtained and transmitted at any timing.

9. The method according to claim 8, wherein the mobile communication terminals each have a setting step for setting either one of said communication modes.

10. The method according to claim 8, wherein the mobile communication terminals each have an instructing step for externally instructing any timing in the third communication mode.

11. The method according to claim 8, wherein the mobile communication terminals each have an instructing step for externally instructing any timing in the third communication mode.

12. The method of claim 8, wherein said substantially uniform time intervals are set based on a capacity of said radio external interface.

13. The method of claim 8,
   wherein said data comprises media data having a specified frame rate; and
   wherein said substantially uniform time intervals are set based on said frame rate of said data.

14. The method of claim 13, wherein said data comprises motion picture images.

15. A storage medium storing a program for causing a mobile communication system, in which a plurality of mobile communication terminals are connected via a mobile communication network and each of the plurality of mobile communication terminals has a radio external interface for performing communication via a communication network different from said mobile communication network, to execute a process, the process comprising the step of:
   causing a given mobile communication terminal to perform a transmitting process for transmitting data displayed on a display unit in the given mobile communication terminal via said radio external interface to another mobile communication terminal at substantially uniform time intervals; and
   causing the another mobile communication terminal to perform a displaying process for displaying said data transmitted by the transmitting process on a particular display unit in said another mobile communication terminal, wherein
   the transmission process may also transmit data in a communication mode selected among:
   a second communication mode, in which whenever data displayed on the display unit are updated, the updated data are obtained and transmitted; and
   a third communication mode, in which data displayed on the display unit are obtained and transmitted at any timing.

16. The storage medium storing the program of claim 15, wherein said substantially uniform time intervals are set based on a capacity of said radio external interface.

17. The storage medium storing the program of claim 15,
  wherein said data comprises media data having a specified frame rate; and
  wherein said substantially uniform time intervals are set based on said frame rate of said data.

18. The storage medium storing the program of claim 17, wherein said data comprises motion picture images.

19. A mobile communication terminal for communicating with a plurality of mobile communication terminals over a communication network, the mobile communication terminal comprising:
  a radio external interface for communicating with another mobile communication terminal over a communication link that is different from the communication network; and
  a display unit for displaying data;
  wherein data displayed on the display unit is transmitted using the radio external interface to the another mobile communication terminal at substantially uniform time intervals; and
  wherein the transmitted data is displayed on a particular display unit of the another mobile communication terminal, and
  wherein the radio external interface may also transmit said data displayed on the display unit in said given mobile communication terminal to said another mobile communication terminal in a communication mode selected among:
  a second communication mode, in which whenever data displayed on the display unit are updated, the updated data are obtained and transmitted; and
  a third communication mode, in which data displayed on the display unit are obtained and transmitted at any timing.

* * * * *